US012800722B2

(12) United States Patent
Chuang et al.

(10) Patent No.: US 12,800,722 B2
(45) Date of Patent: Nov. 17, 2026

(54) COVER MODULE OF LIDAR SYSTEM

(71) Applicant: TPK Advanced Solutions Inc., Xiamen (CN)

(72) Inventors: Cheng Ju Chuang, Taipei City (TW); Wei Yi Lin, Taipei City (TW); Chien Lin Cheng, Taipei City (TW)

(73) Assignee: TPK Advanced Solutions Inc., Xiamen (CN)

( * ) Notice: Subject to any disclaimer, the term of this patent is extended or adjusted under 35 U.S.C. 154(b) by 275 days.

(21) Appl. No.: 18/824,328

(22) Filed: Sep. 4, 2024

(65) Prior Publication Data

US 2025/0189633 A1 Jun. 12, 2025

(30) Foreign Application Priority Data

Dec. 6, 2023 (CN) ......................... 202311675680.2

(51) Int. Cl.
*G01S 7/48* (2006.01)
*G01S 7/481* (2006.01)
*G01S 7/497* (2006.01)

(52) U.S. Cl.
CPC ............ *G01S 7/4813* (2013.01); *G01S 7/497* (2013.01); *G01S 2007/4977* (2013.01)

(58) Field of Classification Search
CPC ................... G01S 7/4813; G01S 7/497; G01S 2007/4977; G01S 17/08
See application file for complete search history.

(56) References Cited

U.S. PATENT DOCUMENTS

2026/0140364 A1* 5/2026 An ..................... G02B 27/0006

FOREIGN PATENT DOCUMENTS

| | | | | | |
|---|---|---|---|---|---|
| CN | 113906318 | A | | 1/2022 | |
| FR | 3153281 | A1 | * | 3/2025 | ........... E06B 3/5436 |
| TW | 201940329 | A | | 10/2019 | |
| TW | 202124313 | A | | 7/2021 | |
| TW | 202326183 | A | | 7/2023 | |
| WO | 2023116886 | A1 | | 6/2023 | |
| WO | WO-2026139971 | A1 | * | 7/2026 | |

* cited by examiner

*Primary Examiner* — Tony Ko
(74) *Attorney, Agent, or Firm* — COOPER LEGAL GROUP LLC

(57) ABSTRACT

A cover module of a LIDAR system includes a first glass, a heating unit, and a second glass. The heating unit is disposed on an outer side of the first glass. The second glass is disposed on an outer side of the heating unit, wherein a deviation between a transmittance of a major wavelength range of the cover module and a transmittance of a secondary wavelength range of the cover module is less than 2%. A wavelength of the secondary wavelength range is calculated by the following formula: (wavelength of the major wavelength range)+$[\Delta T+(T_{fog}-T_0)]\times\alpha$, in which the $T_0$ is an initial temperature of the light source unit, $T_{fog}$ is a temperature of dew point, $\Delta T$ is a defogging temperature deviation, and $\alpha$ is a wavelength shift with temperature coefficient of the light source unit.

19 Claims, 2 Drawing Sheets

COVER MODULE OF LIDAR SYSTEM

CROSS-REFERENCE TO RELATED APPLICATION

The instant application claims priority to China Patent Application 202311675680.2, filed on Dec. 6, 2023, which is incorporated herein by reference.

FIELD OF DISCLOSURE

The present disclosure relates to a Lidar system, more specifically a cover module of the Lidar system.

BACKGROUND OF THE DISCLOSURE

Light detection and ranging (LIDAR) is a remote sensing/detecting technology used for measuring the distance of a remote target that has been implemented in port automation, traffic management systems, etc. Generally, LIDAR comprises light sources and receivers. The light source can be a laser device that transmits light of a specific wavelength, for example, infrared, visible, or ultraviolet light in the electromagnetic spectrum. One of the mechanisms of the LIDAR system for calculating the distance of an object is to transmit light from the light source to the target; and the light is scattered/reflected by the target. The scattered/reflected light is sensed by the receiver. Based on the reflective signals, the distance on the straight-line path between the object and the LIDAR system is calculated. For example, the system can calculate the distance between the LIDAR system and the target based on the travel time of the light detected by the receiver of the LIDAR system.

Currently, most of the international classifications of self-driving cars are based on those classified by the Society of Automotive Engineers (SAE International): levels 1-3 to be advanced driver assistance systems (ADAS) and levels 4-5 to be automated driving (AD) systems. The LIDAR system can provide delicate 3D images to identify vehicles, motorcycles, bikes, pedestrians, and even gestures of traffic policemen. Therefore, the LIDAR system becomes an indispensable key system in automated driving systems.

The cover module of a LIDAR system (for example, a glass cover) should have a high transmittance in a specific wavelength range in order to increase the signal-noise ratio. In other words, the cover module can shield the light of those unnecessary wavelength ranges as much as possible and then allow the receiver to detect the light of preset wavelength ranges without the need for further signal filtering processes. For example, LIDAR systems adopt a 905 nm light source, and hence the cover module thereof tends to have a high transmittance for light of 905 nm and shields light of other wavelength ranges. In the required conditions of the aforementioned signal processing, the cover module will rule out certain glass with high transmittance over a wide range of wavelengths, such as glass with a high transmittance (at least 91%) in the wavelength range of 800-1580 nm disclosed in Patent No. WO2023116886, or glass with a high transmittance (larger than 92%) in the wavelength range of 920-1000 nm disclosed in Patent No. CN113906318. The aforementioned glass cannot be applied in LIDAR systems since the systems will receive too much noise resulting in complex calculations in the LIDAR system and, as a result, affecting the reliability of automatic driving systems.

Furthermore, acting as a route of transmitting/receiving light signals, the configuration and design factors of a cover module to be considered need to be comprehensive instead of merely taking into account of one single factor of the preset wavelength range of the light source.

SUMMARY

The objective of the present disclosure is to provide a cover module of the LIDAR system, wherein signals can still transit through the cover module during heating and defogging.

To achieve the aforementioned objective, the present disclosure provides a cover module of the LIDAR system, wherein the LIDAR system comprises a light source unit, and the cover module comprises a first glass, a heating unit, and a second glass. The heating unit is disposed on the first glass and the second glass is disposed on the heating unit, wherein a deviation between a transmittance of a major wavelength range of the cover module and a transmittance of a secondary wavelength range of the cover module is less than 2%; and a wavelength of the secondary wavelength range by is calculated the following formula: (wavelength of the major wavelength range)+$[\Delta T+(T_{fog}-T_0)]\times\alpha$, where $T_0$ is an initial temperature of the light source unit, $T_{fog}$ is a temperature of dew point, $\Delta T$ is a defogging temperature deviation, and $\alpha$ is a wavelength shift with temperature coefficient of the light source unit.

In several embodiments, the transmittance of the major wavelength range of the cover module is larger than the transmittance of the secondary wavelength range of the cover module.

In several embodiments, both the transmittance of the major wavelength range of the cover module and the transmittance of the secondary wavelength range of the cover module are larger than 90%.

In several embodiments, a wavelength of the major wavelength range of the cover module is 890-910 nm and a wavelength of the secondary wavelength range of the cover module is 910-930 nm, or the wavelength of the major wavelength range of the cover module is 1545-1550 nm and the wavelength of the secondary wavelength range of the cover module is 1565-1575 nm.

To achieve the aforementioned objective, the present disclosure provides a cover module of the LIDAR system, comprising a first glass, a heating unit, and a second glass. The heating unit is disposed on the first glass and the second glass is disposed on the heating unit, wherein a deviation between a transmittance of a major wavelength range of the cover module and a transmittance of a secondary wavelength range of the cover module is less than 2%; and a wavelength of the major wavelength range of the cover module is 900-910 nm and a wavelength of the secondary wavelength range of the cover module is 920-930 nm.

In several embodiments, the transmittance of the major wavelength range of the cover module is larger than the transmittance of the secondary wavelength range of the cover module.

In several embodiments, both the transmittance of the major wavelength range of the cover module and the transmittance of the secondary wavelength range of the cover module are larger than 90%.

To achieve the aforementioned objective, the present disclosure provides a cover module of the LIDAR system, comprising a first glass, a heating unit, and a second glass. The heating unit is disposed on the first glass and the second glass is disposed on the heating unit, wherein a deviation between a transmittance of a major wavelength range of the cover module and a transmittance of a secondary wavelength range of the cover module is less than 2%; and a wavelength of the major wavelength range of the cover module is 1545-1555 nm and a wavelength of the secondary wavelength range of the cover module is 1565-1575 nm.

In several embodiments, the transmittance of the major wavelength range of the cover module is larger than the transmittance of the secondary wavelength range of the cover module.

In several embodiments, both the transmittance of the major wavelength range of the cover module and the transmittance of the secondary wavelength range of the cover module are larger than 90%.

In several embodiments, the first glass is a spectral filter.

The effect of the present disclosure is to design a cover module with an optical feature, under the impact of wavelength shift of the light source unit caused by the increasing system temperature, that has a high transmittance in the secondary wavelength range in addition to the major wavelength range, so that the light emitted by the light source unit or the light reflected back by the target can still pass through the cover module for the system to perform sensing operations during heating and defogging, if necessary.

BRIEF DESCRIPTION OF THE DRA WINGS

DETAILED DESCRIPTION

The present disclosure will become more fully understood from the detailed descriptions given herein below by means of the embodiments with reference to the accompanying drawings and component symbols for illustration only, so that those skilled in the art may use any alternative embodiments that are modified or changed without departing from the spirit and scope of the present disclosure and should be included in the appended claims.

Figure 1:
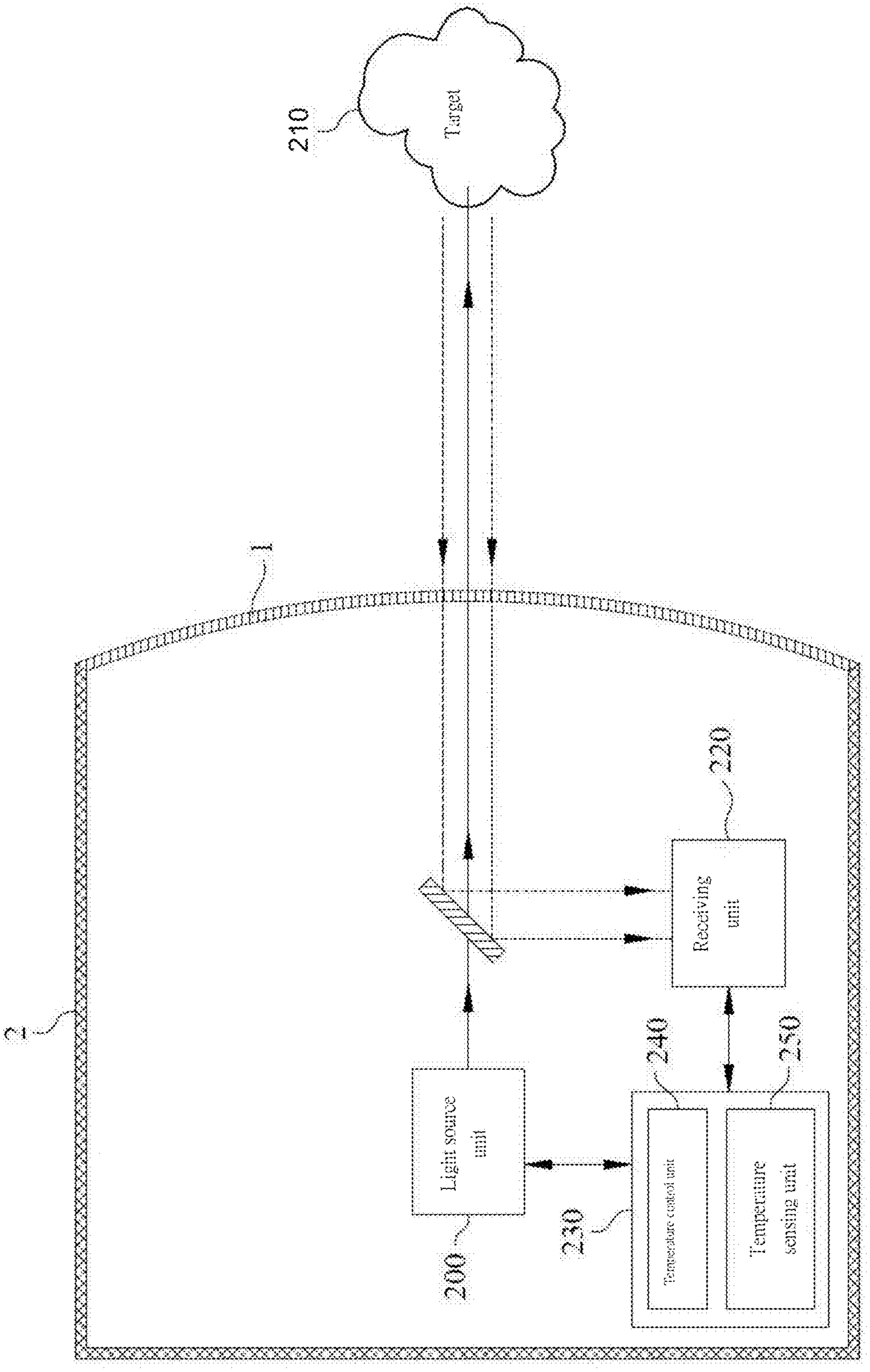
FIG. 1 is a schematic diagram of a LIDAR system of the present disclosure.

FIG. 1 is a schematic diagram of a LIDAR system of the present disclosure. In this embodiment, the LIDAR system comprises a cover module 1 and a casing 2 together, to form a receiving space for disposing various components of the LIDAR system. The cover module 1 and the casing 2 are assembled in a suitable form, including but not limited to snap in fastening, adhesive bonding, being formed individually by one single process, etc. The LIDAR system of the present disclosure may comprise a light source unit 200, a control unit 230, and a receiving unit 220. In one embodiment, the light source unit 200 is a near-infrared semiconductor laser unit that emits pulsed laser featuring a target wavelength of 905 nm and a time period of a laser pulse width of 5-10 ns; or the light source unit 200 is a near-infrared semiconductor laser unit that emits continuous-wave laser featuring a target wavelength of 905 nm. The receiving unit 220 corresponds to the light source unit 200 to receive the refective signals reflected by the target 210, for example photosensors, more specifically, photodiodes (PD) or avalanche photodiodes (APD).

In one embodiment, the LIDAR system uses 32 units of silicon-based semiconductor lasers and 32 units of photodiodes, arranged in an array layout, and able to receive 32 sets of distance data each time. The array can be equipped with a motor to rotate and measures every 0.1 degree. Therefore, a total of 3600 measurements for one rotation of 360 degrees is obtained. The rotation speed of the LIDAR system of the embodiment is 5 revolutions per second, and the LIDAR system can collect 32×3600×5=576000 sets of data per second.

Figure 2:
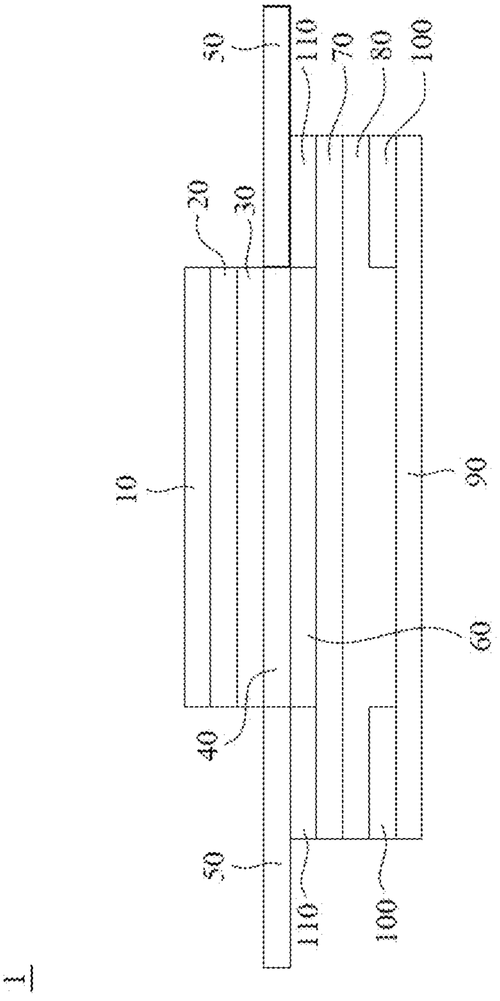
FIG. 2 is a schematic diagram of a cover module of the present disclosure.

Please refer to FIG. 2. FIG. 2 is a schematic diagram of a cover module 1 of the present disclosure. As illustrated in FIG. 2, the cover module 1 comprises a first glass 20, a heating unit 70, and a second glass 90. In this embodiment, the light source unit 200 can emit pulsed laser featuring a target wavelength of 905 nm, wherein the cover module 1 has a high transmittance for the light at a wavelength of 905 nm. For example, the cover module 1 may have a transmittance of larger than 90%, larger than 91%, or larger than 92% for the light at a wavelength of 905 nm. Preferably, the cover module 1 has low transmittance for visible light in a wavelength range between 300-700 nm. For instance, the cover module 1 may have a transmittance of smaller than 5%, smaller than 1%, or smaller than 0.1% for visible light in a wavelength range between 300-700 nm.

The LIDAR system is easily impacted by poor weather and, particularly, frost and fog can have a serious impact. In an environment having frost and fog, signals emitted to and reflected back from the target 210 are significantly attenuated, and the system may not sense objects in the front direction. Frost and fog may also cause a false alarm interference effect on reflective signals by water particles of the frost and fog. In view of this, the cover module 1 of the embodiment comprises a heating unit 70 that can increase the temperature of the cover module 1 to be higher than the temperature of dew point in order to remove frost formed on the cover module 1 or fog attached on the outer surface of the cover module 1. In terms of a general definition, the temperature of dew point is the temperature at which air becomes saturated with moisture at a given pressure, resulting in liquid water formation. When the liquid water is formed and floating in the air, the liquid water is called fog. When the liquid water is formed and attached to the surface of a solid object, the liquid water is called dew. For the ease of explanation, terms such as fog, dew, and frost merely mean the water in different phases or locations in this disclosure. Regardless of which term for water is used, it means the water molecules attached on the cover module 1 of the embodiments of the present disclosure. One function of the heating unit 70 of the cover module 1 is to increase the temperature of the system in order to eliminate the adhesion phenomenon.

The heating unit 70 of the embodiment is disposed between the first glass 20 and the second glass 90. In general, the first glass 20 of the embodiment is a filter glass (having a glass thickness of 3-4 mm, manufacturer: Coherent). Such filter glass contains a plurality of oxides, for example $SiO_2$, ZnO, $K_2O$, $TeO_2$, and $SO_3$, Cadmium (Cd)/Zinc (Zn), and Group 6A compounds, for example CdS, CdSe, CdTe, ZnS, ZnSe, and ZnTe. The first glass 20 has a low transmittance, for example smaller than 5% or smaller than 2%, for visible light (for example, in a wavelength range of 400 nm-700 nm). However, the first glass 20 has a high transmittance, for example larger than 85%, for near-infrared light (for example, in a wavelength range of 780 nm-1000 nm). The heating unit 70 is disposed on the outer side of the first glass 20 on a transparent conductive thin film (for example, an indium tin oxide (ITO) thin film), printing conductive lines of silver paste, etc. The second glass 90 is a glass (having a refractive index n=1.50-1.52, a glass thickness of 0.7-1.1 mm, manufacturer: Token) and is disposed on the outer side of the heating unit 70. The second glass 90 has an outer surface facing the environment, wherein the aforementioned frost and fog may be formed on the outer surface of the second glass 90. In another embodiment, the first glass 20 and the second glass 90 have an anti-reflective coating (AR coating) layer 10 thereon separately. More specifically, the anti-reflective coating layer 10 has multiple layers of both high refractive index layers (for example, niobium pentoxide $Nb_2O_5$ having a refractive index n=2.30-2.40) and low refractive index layers (for example, silicon dioxide $SiO_2$ having a refractive index n=1.48-1.52) staggered alternately together.

As described previously, when the temperature of the LIDAR system of the embodiment of the present disclosure (especially the temperature of the cover module 1) is lower or equal to the temperature of dew point, and the humidity of air surrounding the surface of the cover module 1 reaches saturation or over-saturation, fog/dew/frost will come to form. In one embodiment, the cover module 1 is disposed with a temperature sensor (not shown in the figure) thereon. When the temperature sensing unit 250 of the control unit 230 senses the temperature of the cover module 1 through the temperature sensor to be lower or equal to the dew point, the temperature control unit 240 of the control unit 230 will activate the heating unit 70 to start heating the cover module 1 in order to prevent fog/dew/frost from forming on the cover module 1. According to the general theory, such as those in the "Handbook of thermalphysical properties of engineering materials commonly used", the temperature of dew point is associated with the moisture content in air. For example, when the moisture content in air is about 85 g/kg, the temperature of dew point is 55° C., and when the moisture content in air is about 65 g/kg, the temperature of dew point is 45° C. Furthermore, taking into the consideration of defogging efficiency, the temperature of the heating unit 70 in one embodiment is set to be 15-20° C. higher than the temperature of dew point (that is, the defogging temperature deviation ΔT=15-20° C.). In other words, in an environment in which the temperature of dew point is 55° C., the heating temperature of the heating unit 70 is set as 70-75° C. In another embodiment, the defogging temperature deviation ΔT=0-10° C. For example, defogging temperature deviation ΔT is 0° C., 2° C., 5° C., 7° C., 10° C., etc.

However, the light source unit 200 of the LIDAR system of the embodiment of the present disclosure is a component sensitive to temperature, as those disclosed in issued and published China Patents such as CN115265816 describe. The wavelength of light emitted by light source unit 200 will shift due to the changes of the temperature. This is called wavelength shift with temperature effect, and the wavelength shift with temperature effect to the light source unit 200 may be calculated and measured as a wavelength shift with temperature coefficient. In general, wavelength shift with temperature coefficient of the light source unit 200 is a relatively stable value. Therefore, in an environment with an increasing temperature, light emitted by the light source unit 200 will shift to a long wavelength range. In this embodiment, the preset wavelength of the light source unit 200 is 905 nm. However, in the heating and defogging process, the wavelength of the light source unit 200 shifts to: $905+[\Delta T+(T_{fog}-T_0)]\times\alpha$ (unit: nm), where $T_0$ is an initial temperature of the light source unit 200 (for example, room temperature), $T_{fog}$ is a temperature of dew point, ΔT is a defogging temperature deviation, and α is a wavelength shift with temperature coefficient.

In one embodiment, the light source unit 200 is an edge emitting semiconductor laser chip (EEL chip), having a wavelength shift with temperature coefficient of 0.2-0.3 nm/° C. or smaller. Given the following surrounding conditions (as an example, but not to limit the present disclosure): if the automated driving system of the embodiment of the present disclosure is used in cold regions with an outdoor temperature of −10° C., the moisture content in air of 85 g/kg, and a defogging temperature deviation of ΔT=20° C., in winter, by applying this data to the equation of wavelength shift with temperature effect, the emitted wavelength of the light source unit 200 shifts to 922-930 nm. Therefore, due to the wavelength shift with temperature effect, the cover module 1 not only needs to have a high transmittance in a major wavelength range (that is 905 nm), but also needs to have a high transmittance in a secondary wavelength range (that is, a shifting range from major wavelength of 905 nm to wavelength range between 922-930 nm), so that the light of the secondary wavelength range produced by the increasing temperature during the defogging process can penetrate through the cover module 1. On the other hand, even though the cover module 1 has a high transmittance in the secondary wavelength range, the overall LIDAR system will not have excessive noise interference triggered by the high transmittance in the secondary wavelength range in general conditions (that is, without heating and defogging).

In summary, the embodiments of the present disclosure provide a cover module 1 that allows light of both the major wavelength range and the secondary wavelength range to pass through, wherein, light of the major light source and light of the second wavelength range are emitted under conditions of different temperatures separately. A deviation between a transmittance of a major wavelength range of the cover module 1 and a transmittance of a secondary wavelength range of the cover module 1 is less than 2% or less than 1%. In the embodiments of the present disclosure, the wavelength of the major wavelength range is 900-910 nm (including the preset wavelength of 905 nm of the major light source). In consideration of the control of full width at half maximum (FWHM) of laser emitted from the light source unit 200, the calculation method can be 905 nm±5%. Therefore, the major wavelength range of light emitted from the light source unit 200 is 900-910 nm, whereas the secondary wavelength range is 920-930 nm. Since the optical requirements of the cover module 1 define a high transmittance in a major wavelength range (900-910 nm, including the wavelength of 905 nm of the major light source), the embodiment of the present disclosure selects the transmittance of the major wavelength range as the basis and further defines a deviation between the transmittance of the second wavelength range and the aforementioned basis, so that the cover module 1 meets the requirement of having a high transmittance in the secondary wavelength range. In other words, the present disclosure has taken into account the wavelength shift with temperature effect caused by the increasing system temperature and provides a design of a cover module 1 having a high transmittance in a secondary wavelength range as a control method, so that the light source unit 200 can still perform detecting operations through the cover module 1 during heating and defogging.

The transmittance of the major wavelength range is larger than the transmittance of the secondary wavelength range of the cover module 1 of the preferred embodiment of the present disclosure. Preferably, for the cover module 1 of the embodiment of the present disclosure, the transmittance of the major wavelength range (900-910 nm, including the wavelength of 905 nm of the major light source) is larger than 91%, the transmittance of the secondary wavelength range (920-930 nm, including the wavelength range after the wavelength shift with temperature effect) is larger than 90%, and the deviation between the transmittance of the major wavelength range and that of the secondary wavelength range is 1%. After the simulation, in an environment of room temperature and an environment of defogging and heating, the LIDAR system of the embodiment of the present disclosure can meet the needs for the applications of aforementioned advanced driver assistance systems or automated driving systems.

As illustrated in FIG. 2, in a preferred embodiment, the cover module 1 further comprises an anti-reflective coating layer 10, an optical adhesive layer 30, a passivation layer 40, a circuit board 50, a first index match layer 60, a second index match layer 80, and two black matrix (BM) layers 100. The anti-reflective coating layer 10 is located in the innermost side of the cover module 1 and has 6 layers of both high refractive index layers (for example, niobium pentoxide $Nb_2O_5$ having a refractive index n=2.35) and low refractive index layers (for example, silicon dioxide $SiO_2$ having a refractive index n=1.49) staggered alternately together. The first glass 20 is disposed on the anti-reflective coating layer 10. The optical adhesive layer 30 is disposed on the surface of the first glass 20 and is optical clear adhesive (OCA) (manufacturer: 3M). The passivation layer 40 is disposed on the outer surface of the optical adhesive layer 30 to protect the first glass 20. The first index match layer 60 is disposed on the outer surface of the passivation layer 40 and is made of $SiN_x$ (n=1.67) with a thickness of 500 nm. The heating unit 70 is disposed on the outer surface of the first index match layer 60, is a indium tin oxide (ITO) thin film, and is electrically connected to the circuit board 50 through the busbar 110. The second index match layer 80 is disposed on the outer surface of the heating unit 70 and is made of the composition of $SiO_2$ (n=1.49) with a thickness of 350 nm and $SiN_x$ (n=2.02) with a thickness of 200 nm. The black matrix layers 100 are disposed on both sides of the cover module 1 separately to shield the busbar 110 from being seen by users. This embodiment selects an edge emitting semiconductor laser chip, having the wavelength shift with temperature coefficient to be 0.15 nm/° C., as the light source unit 200.

According to the structure described previously, the first embodiment of the present disclosure uses an indium tin oxide (ITO) thin film having 50±10 (as the heating unit 70 produced under first process condition. According to the lower limit of the operating temperature (−40° C.) of the light source unit 200 for calculation (namely using the aforementioned formula, where $T_0$ is −40° C.), the light source unit 200 has an emitting wavelength of 921.5 nm after heating and defogging. In other words, the secondary wavelength range is set to be 920-930 nm in this embodiment in order to cover the maximum range of the wavelength shift with temperature effect. According to optical measurements for the cover module 1 of the first embodiment of the present disclosure, the transmittance of the major wavelength range (900-910 nm, including the wavelength of 905 nm of the major light source) is 92.54%, the transmittance of the secondary wavelength range (920-930 nm, including the wavelength range after the wavelength shift with temperature effect) is 91.69%, and the deviation between the transmittance of the major wavelength range and that of the secondary wavelength range is 0.85%.

The second embodiment of the present disclosure is the same as the first embodiment, except that the heating unit 70 is an indium tin oxide thin film having 25±9Ω produced under a second process condition. According to optical measurements, the transmittance of the major wavelength range (900-910 nm, including the wavelength of 905 nm of the major light source) is 94.91%, the transmittance of the secondary wavelength range (920-930 nm, including the wavelength range after the wavelength shift with temperature effect) is 94.41%, and the deviation between the transmittance of the major wavelength range and that of the secondary wavelength range is 0.5%.

The first comparative example of the present disclosure is the same as the first embodiment, except that the heating unit 70 is an indium tin oxide thin film having 25±9Ω produced under the first process condition. According to optical measurements, the transmittance of the major wavelength range (900-910 nm, including the wavelength of 905 nm of the major light source) is 89.75%, the transmittance of the secondary wavelength range (920-930 nm, including the wavelength range after the wavelength shift with temperature effect) is 86.78%, and the deviation between the transmittance of the major wavelength range and that of the secondary wavelength range is 2.97%.

After the simulation, in an environment under room temperature and an environment that is defogging and heating, light emitted by the light source unit 200 and the light scattered/reflected by the target 210 can be used together with the cover module 1 of the first embodiment and the second embodiment, respectively, to complete operations of detecting objects and measuring distance. In other words, in the aforementioned two environmental conditions, the cover module 1 of the present disclosure lets sufficient light signals pass through, which will not allowing the signal-noise ratio to increase significantly and which will lead to the decrease of computational efficiency of the overall system. In contrast, the secondary wavelength range of the first comparative example has a low transmittance (compared to that of the major wavelength range). During the defogging and heating stage, it is observed that the light emitted by the light source unit 200 cannot pass through the cover module 1 effectively. Even when a small amount of light emitted by the light source passes through, the light scattered/reflected by the target 210 and returning to the receiving unit 220 is difficult to be collected (that is, shielded by the cover module 1). As a result, the control unit 230 cannot accurately compute the object/distance in the front direction of the vehicle. Based on the formula of photoelectric current signals measured by an infrared system, the level of significance of the photoelectric current signals is directly associated with the transmittance of light. Therefore, when the system temperature increases and causes the light source unit 200 to have wavelength shift with temperature effect, the high transmittance in the secondary wavelength range of the cover module 1 allows the automated driving system to obtain the surrounding data.

The present disclosure provides a defogging method for the cover module 1 of the automated driving system of the aforementioned embodiment, comprising the following steps: emitting signals for sensing by the light source unit 200, wherein the wavelength of the signals for sensing (that is, light) can be 905 nm or within the range of 900-910 nm. The signals for sensing pass through the cover module 1 and radiate to the surrounding. The signals for sensing are reflected or scattered by the target 210, and the reflected signals pass through the cover module 1 and return to the system. The receiving unit 220 receives the reflected signals, wherein the reflected signals are used by the control unit 230 to compute the location/distance of the target 210. In the aforementioned steps, since the heating unit 70 is not activated for heating, it is considered a preset environment for the light source unit 200 (no wavelength shift with temperature effect). Both the signals for sensing and the reflected signals for sensing can effectively pass through the cover module 1 that has a high transmittance in the major wavelength range. On the other hand, although under the condition without the wavelength shift with temperature effect, the light in the secondary wavelength range can pass through the cover module 1 and then enter the system as noise. However, since the secondary wavelength range is relatively small (for example, below 10 nm), the overall system is not affected significantly by the noise. This also explains why the aforementioned LIDAR system is not designed to select glass having a high transmittance within a large wavelength range (for example, 920-1000 nm to cover the range of tens or hundreds of nm, as described previously). There will be too much optical noise that overloads the system with computation processes.

The aforementioned steps further comprises: the temperature sensing unit 250 sensing the existence of fog/dew/frost on the cover module 1, and the temperature control unit 240 activating the heating unit 70, so that the heating unit 70 starts heating the cover module 1. In the aforementioned steps, after the heating unit 70 is activated and starts the heating function, the light source unit 200 begins to have the wavelength shift with temperature effect (that is, the wavelength shifting from the major wavelength range to the secondary wavelength range) in the environment with increasing temperature. The cover module 1 of the embodiments of the present disclosure continues having a high transmittance to light that occurs after the wavelength shift with temperature effect. Both the signals for sensing and reflected/returned signals for sensing can pass through the cover module 1 that also has a high transmittance in the secondary wavelength range. In such an environment with increasing temperature, the optical signals in the secondary wavelength range become the major signals, whereas the signals in the major wavelength range become noise instead. It has been verified that, under the aforementioned condition, the cover module 1 of the present disclosure can meet the requirements of the automated driving system to obtain the surrounding data.

In another embodiment, the light source unit 200 is also an edge emitting semiconductor laser chip and emits light having a wavelength of 1550 nm. Based on the wavelength shift with temperature effect, during the aforementioned heating and defogging process, the wavelength of the light source unit 200 shifts to become $1550+[\Delta T+(T_{fog}-T_0)]\times\alpha$, where $T_0$ is an initial temperature of the light source unit 200, $T_{fog}$ is a temperature of dew point, $\Delta T$ is a defogging temperature deviation, and $\alpha$ is a wavelength shift with temperature coefficient. In one embodiment, the wavelength shift with temperature coefficient is 0.2-0.3 nm/° C. or smaller. In the following scenario for calculation, the automated driving system of the embodiment of the present disclosure is used in cold regions with an outdoor temperature of −10° C. during winter, the moisture content in air of 85 g/kg, and a defogging temperature deviation of $\Delta T$=20° C. By applying this data to the equation of wavelength shift with temperature effect, the emitted wavelength of the light source unit 200 shifts to 1565-1575 nm. In other words, the deviation between a transmittance of a major wavelength range (1545-1555 nm, including the wavelength of 1550 nm of the major light source) and a transmittance of a secondary wavelength range (1565-1575 nm, including the wavelength range after the wavelength shift with temperature effect) of the cover module 1 of the embodiment of the present disclosure is less than 2% or less than 1%. In another variant embodiment, the wavelength shift due to heating is calculated by taking the lower limit of the operating temperature (−40° C.) of the light source unit 200 for calculation (using the aforementioned formula, where $T_0$ is −40° C.).

In another embodiment, the light source unit 200 is also an edge emitting semiconductor laser chip and emits light having a wavelength of 1350 nm. Based on the wavelength shift with temperature effect, during the aforementioned heating and defogging process, the wavelength of the light source unit 200 shifts to become $1350+[\Delta T+(T_{fog}-T_0)]\times\alpha$, where $T_0$ is an initial temperature of the light source unit 200, $T_{fog}$ is a temperature of dew point, $\Delta T$ is a defogging temperature deviation, and $\alpha$ is a wavelength shift with temperature coefficient. In one embodiment, the wavelength shift with temperature coefficient is 0.2-0.3 nm/° C. or smaller. In the following scenario for calculation, the automated driving system of the embodiment of the present disclosure is used in cold regions with an outdoor temperature of −10° C. during winter, the moisture content in air of 85 g/kg, and a defogging temperature deviation of $\Delta T$=20° C. By applying this data to the equation of wavelength shift with temperature effect, the emitted wavelength of the light source unit 200 shifts to 1365-1375 nm. In other words, the deviation between a transmittance of a major wavelength range (1345-1355 nm, including the wavelength of 1350 nm of the major light source) and a transmittance of a secondary wavelength range (1365-1375 nm, including the wavelength range after the wavelength shift with temperature effect) of the cover module 1 of the embodiment of the present disclosure is less than 2% or less than 1%.

In one preferred embodiment, the transmittance of the major wavelength range is larger than the transmittance of the secondary wavelength range. Hereby, when the temperature is the preset working temperature of the light source unit 200, both the emitting signals for sensing and the reflected signals by objects pass through the cover module 1 correctly, so that the sensing accuracy is maintained properly.

In one preferred embodiment, both the transmittance of the major wavelength range and the transmittance of the secondary wavelength range are larger than 85%.

In one preferred embodiment, a proper light source unit 200 is selected based on the condition that the deviation between the transmittance of a major wavelength range and the transmittance of a secondary wavelength range is less than 1%. For example, the wavelength of the major wavelength range of the cover module 1 is set as 905 nm (transmittance of 91%) and the wavelength of the secondary wavelength range of the cover module 1 is 920-925 nm (transmittance of 90%). The wavelength shift with temperature of the cover module 1 of the embodiment of the present disclosure is 20-25 nm. In this scenario, the automated driving system is used in temperate regions with an outdoor temperature of 10° C. during winter, the moisture content in air of 85 g/kg, and a defogging temperature deviation of $\Delta T$=20° C. By applying this data to the equation of wavelength shift with temperature effect, the wavelength shift with temperature coefficient of the light source unit 200 is 0.3-0.38. That means the light source unit 200 having a temperature coefficient of 0.3-0.38 can be chosen for matching the cover module 1 having wavelength shift with temperature effect of 20-25 nm. In other words, the present disclosure provides a cover module 1 that matches the needs and requirements for the light source unit 200 for controlling and maintaining a high transmittance of the cover module 1 to cope with the light emitted by the light source unit 200 after the wavelength shift with temperature effect, in order to meet the required reliability of the LIDAR system.

Although the present disclosure has been described in considerable detail with reference to certain embodiments thereof, other embodiments are possible. Therefore, the spirit and scope of the appended claims should not be limited to the descriptions of the embodiments contained herein. It will be apparent to those skilled in the art that various modifications and variations can be made to the structure without departing from the scope or spirit of the disclosure.

COMPONENT SYMBOL

1: cover module
2: casing
10: anti-reflective coating (AR coating) layer
20: first glass
30: optical adhesive layer
40: passivation layer
50: circuit board
60: first index match layer
70: heating unit
80: second index match layer
90: second glass
100: black matrix (BM) layer
110: busbar
200: light source unit
210: target
220: receiving unit
230: control unit
240: temperature control unit
250: temperature sensing unit

What is claimed is:

1. A cover module of a light detection and ranging (LIDAR) system, wherein the LIDAR system comprises a light source unit and the cover module comprises:
- a first glass;
- a heating unit, disposed on the first glass; and
- a second glass, disposed on the heating unit;
- wherein a deviation between a transmittance of a major wavelength range of the cover module and a transmittance of a secondary wavelength range of the cover module is less than 2%; and a wavelength of the secondary wavelength range is calculated by the following formula: (wavelength of the major wavelength range)+$[\Delta T+(T_{fog}-T_0)]\times\alpha$, wherein $T_0$ is an initial temperature of the light source unit, $T_{fog}$ is a temperature of dew point, $\Delta T$ is a defogging temperature deviation, and $\alpha$ is a wavelength shift with temperature coefficient of the light source unit.

2. The cover module of the LIDAR system as claimed in claim 1, wherein the transmittance of the major wavelength range is larger than the transmittance of the secondary wavelength range.

3. The cover module of the LIDAR system as claimed in claim 1, wherein the transmittance of the major wavelength range and the transmittance of the secondary wavelength range are larger than 90%.

4. The cover module of the LIDAR system as claimed in claim 1, wherein a wavelength of the major wavelength range is 890-910 nm and the wavelength of the secondary wavelength range is 910-930 nm.

5. The cover module of the LIDAR system as claimed in claim 1, wherein a wavelength of the major wavelength range is 1545-1555 nm and the wavelength of the secondary wavelength range is 1565-1575 nm.

6. The cover module of the LIDAR system as claimed in claim 1, wherein a wavelength of the major wavelength range is 1345-1355 nm and the wavelength of the secondary wavelength range is 1365-1375 nm.

7. The cover module of the LIDAR system as claimed in claim 1, wherein the cover module has a transmittance smaller than 5% for visible light in a wavelength range between 300-700 nm.

8. The cover module of the LIDAR system as claimed in claim 1, wherein at least one of the first glass or the second glass has an anti-reflective coating layer.

9. The cover module of the LIDAR system as claimed in claim 1, wherein the first glass is a filter glass having a first transmittance smaller than 5% in a wavelength range of 400 nm-700 nm and having a second transmittance larger than 85% in a wavelength range of 780 nm-1000 nm.

10. A cover module of a light detection and ranging (LIDAR) system, comprising:
- a first glass;
- a heating unit, disposed on the first glass; and
- a second glass, disposed on the heating unit;
- wherein a deviation between a transmittance of a major wavelength range of the cover module and a transmittance of a secondary wavelength range of the cover module is less than 2%; and
- wherein a wavelength of the major wavelength range is 900-910 nm and a wavelength of the secondary wavelength range is 920-930 nm.

11. The cover module of the LIDAR system as claimed in claim 10, wherein the transmittance of the major wavelength range and the transmittance of the secondary wavelength range are larger than 90%, and the transmittance of the major wavelength range is larger than the transmittance of the secondary wavelength range.

12. The cover module of the LIDAR system as claimed in claim 10, wherein the cover module has a transmittance smaller than 5% for visible light in a wavelength range between 300-700 nm.

13. The cover module of the LIDAR system as claimed in claim 10, wherein at least one of the first glass or the second glass has an anti-reflective coating layer.

14. The cover module of the LIDAR system as claimed in claim 10, wherein the first glass is a filter glass having a first transmittance smaller than 5% in a wavelength range of 400 nm-700 nm and having a second transmittance larger than 85% in a wavelength range of 780 nm-1000 nm.

15. A cover module of a light detection and ranging (LIDAR) system, comprising:
- a first glass;
- a heating unit, disposed on the first glass; and
- a second glass, disposed on the heating unit;
- wherein a deviation between a transmittance of a major wavelength range of the cover module and a transmittance of a secondary wavelength range of the cover module is less than 2%; and
- wherein a wavelength of the major wavelength range is 1545-1555 nm and a wavelength of the secondary wavelength range is 1565-1575 nm.

16. The cover module of the LIDAR system as claimed in claim 15, wherein the transmittance of the major wavelength range and the transmittance of the secondary wavelength range are larger than 90%, and the transmittance of the major wavelength range is larger than the transmittance of the secondary wavelength range.

17. The cover module of the LIDAR system as claimed in claim 15, wherein the cover module has a transmittance smaller than 5% for visible light in a wavelength range between 300-700 nm.

18. The cover module of the LIDAR system as claimed in claim 15, wherein at least one of the first glass or the second glass has an anti-reflective coating layer.

19. The cover module of the LIDAR system as claimed in claim 15, wherein the first glass is a filter glass having a first transmittance smaller than 5% in a wavelength range of 400 nm-700 nm and having a second transmittance larger than 85% in a wavelength range of 780 nm-1000 nm.

* * * * *